(12) United States Patent
Kim et al.

(10) Patent No.: US 11,288,526 B2
(45) Date of Patent: Mar. 29, 2022

(54) METHOD OF COLLECTING ROAD SIGN INFORMATION USING MOBILE MAPPING SYSTEM

(71) Applicant: MobilTech, Seoul (KR)

(72) Inventors: Jaeseung Kim, Goyang-Si (KR); Jiseong Kim, Seoul (KR)

(73) Assignee: MobilTech, Seoul (KR)

( * ) Notice: Subject to any disclaimer, the term of this patent is extended or adjusted under 35 U.S.C. 154(b) by 164 days.

(21) Appl. No.: 16/860,668

(22) Filed: Apr. 28, 2020

(65) Prior Publication Data
US 2021/0012124 A1    Jan. 14, 2021

(30) Foreign Application Priority Data
Jul. 9, 2019   (KR) .......................... 10-2019-0082445

(51) Int. Cl.
*G06K 9/00*        (2006.01)
*G06K 9/32*        (2006.01)
*G01C 21/36*       (2006.01)

(52) U.S. Cl.
CPC ..... *G06K 9/00818* (2013.01); *G01C 21/3602* (2013.01); *G06K 9/325* (2013.01)

(58) Field of Classification Search
CPC .. G06K 9/00818; G06K 9/325; G06K 9/3241; G06K 9/00791; G01C 21/3602; G01C 21/3811; G01C 21/3822; G01C 21/3848; G06T 2207/30256; G06T 2210/12
See application file for complete search history.

(56) References Cited

U.S. PATENT DOCUMENTS

| 10,169,678 | B1 * | 1/2019 | Sachdeva ............. G05D 1/0221 |
| 10,949,982 | B1 * | 3/2021 | Wang ................. G06K 9/00718 |
| 2002/0085095 | A1 * | 7/2002 | Janssen .................. G01C 21/26 |
| | | | 348/148 |
| 2013/0101174 | A1 * | 4/2013 | Meis ........................ G08G 1/16 |
| | | | 382/104 |
| 2016/0046290 | A1 * | 2/2016 | Aharony ............ G08G 1/09623 |
| | | | 701/41 |

(Continued)

FOREIGN PATENT DOCUMENTS

| KR | 10-1348941 A | 1/2014 |
| KR | 10-2018-0131154 A | 12/2018 |
| KR | 10-2019-0003884 A | 1/2019 |

*Primary Examiner* — Ming Y Hon
(74) *Attorney, Agent, or Firm* — Novick, Kim & Lee, PLLC; Jae Youn Kim; Jihun Kim (57) ABSTRACT

A method of collecting road sign information using a mobile mapping system, which can collect information on the markings on the road in real-time and map the information to a high definition map using the mobile mapping system including a remote sensing device and a navigation device is disclosed. Particularly, the system may collect correct road marking information in real-time by extracting objects and attributes from successive images on the basis of deep learning and map the road marking information to a high definition map, and remarkably improve accuracy of recognizing the road marking information. Accordingly, reliability and competitiveness may be enhanced in the autonomous driving field, the road recognition field, the high definition road map field for autonomous driving, and the fields similar or related thereto.

8 Claims, 7 Drawing Sheets

(56) References Cited

U.S. PATENT DOCUMENTS

| | | | | |
|---|---|---|---|---|
| 2018/0285735 A1* | 10/2018 | Baum | ................... | G06N 20/00 |
| 2019/0130165 A1* | 5/2019 | Seshadri | ............ | G06K 9/00771 |
| 2019/0220675 A1* | 7/2019 | Guo | ................... | G06K 9/00791 |
| 2020/0193643 A1* | 6/2020 | Hess | ..................... | G01S 5/0284 |
| 2020/0249044 A1* | 8/2020 | Watanabe | ............... | G06F 3/013 |
| 2020/0250803 A1* | 8/2020 | Gu | ........................ | G06T 7/0002 |
| 2020/0324787 A1* | 10/2020 | Wang | .................... | B60K 35/00 |
| 2020/0372012 A1* | 11/2020 | Averbuch | ................ | G06F 16/29 |
| 2021/0201070 A1* | 7/2021 | Omari | ............... | G01C 21/3602 |

* cited by examiner

| | | | |
|---|---|---|---|
| Image 0 | 0001 | | |
| Image 1 | 0011 | | |
| Image 2 | 0021 | | |
| Image 3 | 0031 | 0032 | |
| Image 4 | 0041 | 0042 | |
| Image 5 | 0051 | | |
| Image 6 | 0061 | 0062 | |
| Image 7 | 0071 | 0072 | 0073 |
| Image 8 | 0081 | 0082 | |
| Image 9 | 0091 | 0092 | |
| Image 10 | 0101 | 0102 | |

METHOD OF COLLECTING ROAD SIGN INFORMATION USING MOBILE MAPPING SYSTEM

BACKGROUND OF THE INVENTION

Field of the Invention

The present invention relates to a method of collecting road sign information using a mobile mapping system, and more specifically, to a method of collecting road sign information using a mobile mapping system, which can collect information on the markings on the road in real-time and map the information to a high definition map using a mobile mapping system including a remote sensing device and a navigation device.

Particularly, the present invention relates to a method of collecting road sign information using a mobile mapping system, which can collect correct road marking information in real-time by extracting objects and attributes from successive images on the basis of deep learning and map the road marking information to a high definition map, and remarkably improve accuracy of recognizing the road marking information.

Background of the Related Art

Unmanned autonomy of vehicles (autonomous vehicle) may largely comprise the steps of recognizing a surrounding environment, planning a driving route on the basis of the recognized environment, and driving along the planned route, and what is most basically required in this process is a high definition map (HD-map).

The high definition map (HD-map) is a map in which information on surrounding environments such as roads, terrain elevations, curvatures and the like is three-dimensionally implemented, and particularly, the HD-map includes various information required at the time of driving on the road.

For example, the HD-map includes various information needed for driving on a corresponding road, such as lanes, driving directions, intersections, traffic signs, traffic lights, speed limits and the like of the road.

Accordingly, an autonomous vehicle travels on the road while recognizing surrounding environments on the basis of the HD-map using a technique such as 'Road information detecting method for auto-driving robot and auto-driving robot using The Same' disclosed in Korean Patent Registration No. 10-1348941, which is a prior art document described below.

As described above, it can be said that the HD-map is most essential in the autonomous driving field, and also requires most correct and rapid update for safe autonomous driving.

Generally, the HD-map is manufactured through four steps of work planning, data acquisition, point cloud data generation, and object drawing and editing.

Among the four steps, the step of data acquisition collects data on the road mainly using a driving device (vehicle or the like) equipped with LiDAR or the like, and three-dimensional point cloud data of a corresponding road may be generated from the collected data.

At this point, since the generated three-dimensional point cloud data only has information on the shapes of roads, in order to use a corresponding data in a HD-map needed for driving, information that can be acquired by a general driver while driving on the road, such as road surface markings, traffic signs, and traffic lights of the road, should be included.

However, since most of the information like this is manually mapped to a HD-map, there is a problem in that a lot of time and cost are required to manufacture the HD-map.

(Patent Document 1) Korean Patent Registration No. 10-1348941 'Road information detecting method for auto-driving robot and auto-driving robot using The Same'

SUMMARY OF THE INVENTION

Therefore, the present invention has been made in view of the above problems, and it is an object of the present invention to provide a method of collecting road sign information using a mobile mapping system, which can collect information on the markings on the road in real-time and map the information to a high definition map using a mobile mapping system including a remote sensing device and a navigation device.

Particularly, another object of the present invention is to provide a method of collecting road sign information using a mobile mapping system, which can collect correct road marking information in real-time by extracting objects and attributes from successive images on the basis of deep learning and map the road marking information to a high definition map, and remarkably improve accuracy of recognizing the road marking information.

In addition, another object of the present invention is to provide a method of collecting road sign information using a mobile mapping system, which can remarkably improve recall and precision (accuracy) in recognizing an object and attribute information through a process of cleaning a result of recognizing the object as one result.

To accomplish the above objects, a method of collecting road sign information using a mobile mapping system according to an embodiment of the present invention includes: a road data collection step of collecting road data including image data and point cloud data using the mobile mapping system; an object recognition step of detecting a bounding box for each object included in successive image data, and confirming the object and attributes of the corresponding object; and an object mapping step of calculating a spatial coordinate value of a corresponding object on a high definition map from the point cloud data.

In addition, the object recognition step may include: a bounding box information confirmation step of confirming bounding box information including the number of bounding boxes included in the image data, object attribute information of a corresponding bounding box, and location coordinates of the corresponding bounding box; a bounding box information collection step of tracking, for any one bounding box, location coordinates for each image data, and collecting information on the corresponding bounding box for each image data; and an object attribute determination step of selecting an object having the largest number of bounding boxes from objects having the same attribute information among the tracked bounding boxes, as the object of the corresponding boundary box.

In addition, at the bounding box information confirmation step, information on the sequentially collected bounding boxes for each image data may be stored on a two-dimensional vector.

In addition, at the bounding box information collection step, the step of confirming the location coordinates of a corresponding bounding box in a current image data, and confirming a bounding box adjacent to the corresponding location coordinates from a next image data may be sequentially performed to sequentially track bounding boxes adjacent to the corresponding bounding box for each image data.

In addition, at the bounding box information collection step, when there is one bounding box in the next image data within a tracking setting distance from a corresponding position in the current image data on the basis of the location coordinates of the corresponding bounding box, the corresponding bounding box may be selected.

In addition, at the bounding box information collection step, when there are at least two bounding boxes in the next image data within a tracking setting distance from a corresponding position in the current image data on the basis of the location coordinates of the corresponding bounding box, a closest bounding box may be selected.

In addition, at the bounding box information collection step, when a bounding box does not exist in the next image data within a tracking setting distance from a corresponding position in the current image data on the basis of the location coordinates of the corresponding bounding box, tracking of the corresponding bounding box may be stopped.

In addition, at the bounding box information collection step, when a predetermined number of image data, which do not have a bounding box existing in the next image data within a tracking setting distance from a corresponding position in the current image data on the basis of the location coordinates of the corresponding bounding box, are accumulated, tracking of the corresponding bounding box may be stopped.

In addition, the object mapping step may include: a point cloud data extraction step of extracting point cloud data in an inner area of a bounding box of each object from the point cloud data; a coordinate system conversion step of converting three-dimensional coordinates of the point cloud data into a map coordinate system of a high definition map; and an object coordinate calculation step of calculating coordinates of an object included in the corresponding bounding box from the converted map coordinates.

In addition, at the object coordinate calculation step, a median value of the converted points of the point cloud data included in the corresponding bounding box may be calculated for each coordinate axis, and coordinates of the object included in the bounding box may be calculated on the basis of the median value.

DETAILED DESCRIPTION OF THE PREFERRED EMBODIMENT

Examples of a method of collecting road sign information using a mobile mapping system according to the present invention may be diversely applied, and the most preferred embodiment will be described below with reference to the accompanying drawings.

Figure 1:
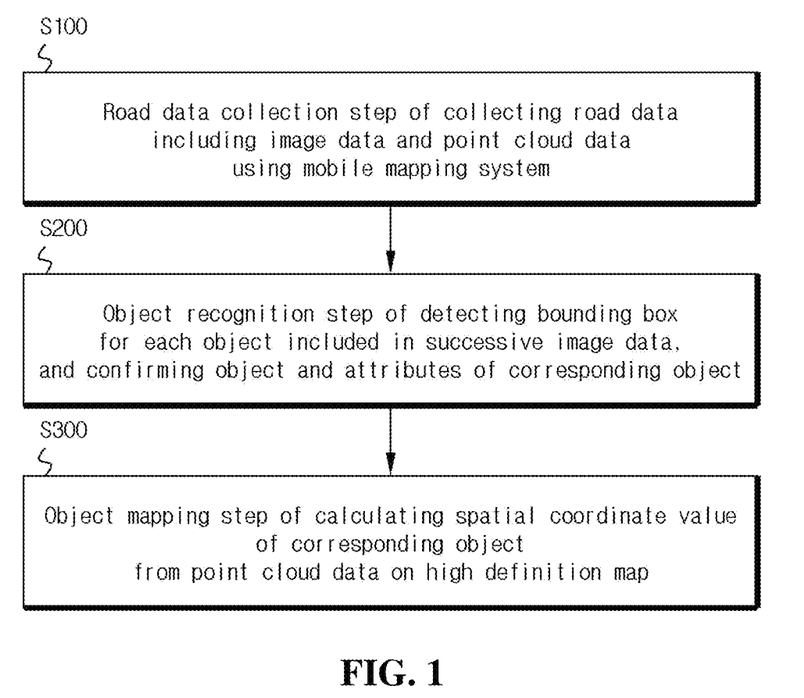
FIG. 1 is a flowchart illustrating an embodiment of a method of collecting road sign information using a mobile mapping system according to the present invention.

FIG. 1 is a flowchart illustrating an embodiment of a method of collecting road sign information using a mobile mapping system according to the present invention.

Referring to FIG. 1, a method of collecting road sign information using a mobile mapping system includes a road data collection step (S100), an object recognition step (S200), and an object mapping step (S300).

The road data collection step (S100) is a step of collecting road data including image data and point cloud data using a mobile mapping system, which collects three-dimensional information of a driving road in real-time.

Here, the mobile mapping system is a system for collecting geospatial data including roads and surrounding environments using a moving object such as a drone, a vehicle or the like equipped with various remote sensing systems such as a camera, radar, laser, LiDAR and the like, and navigation sensors (GPS, INS, etc.).

Particularly, the LiDAR may collect precise three-dimensional point cloud data on the surrounding environment including roads.

In addition, the image data may include visual image information captured using a camera or the like.

The object recognition step (S200) is a step of detecting a bounding box for each object included in successive image data, and confirming the object and attributes of the corresponding object, which can obtain more improved recall and precision (accuracy) through a process of associating and sequentially analyzing the image data collected in real-time, and cleaning the object.

This cleaning process will be described below in more detail through a specific embodiment.

The object mapping step (S300) is a step of calculating a spatial coordinate value of a corresponding object on a high definition map from the point cloud data, which allows real-time processing by minimizing the data required for calculation.

Specifically, at the object mapping step (S300), to calculate a spatial coordinate value of an object, coordinate system matching is performed, after the image data and the LiDAR data are matched, targeting only the point cloud data of a required portion (bounding box), and a corresponding object may be registered on the HD-map.

Hereinafter, a method of collecting road sign information using a mobile mapping system of the present invention will be described in more detail step by step.

Figure 2:
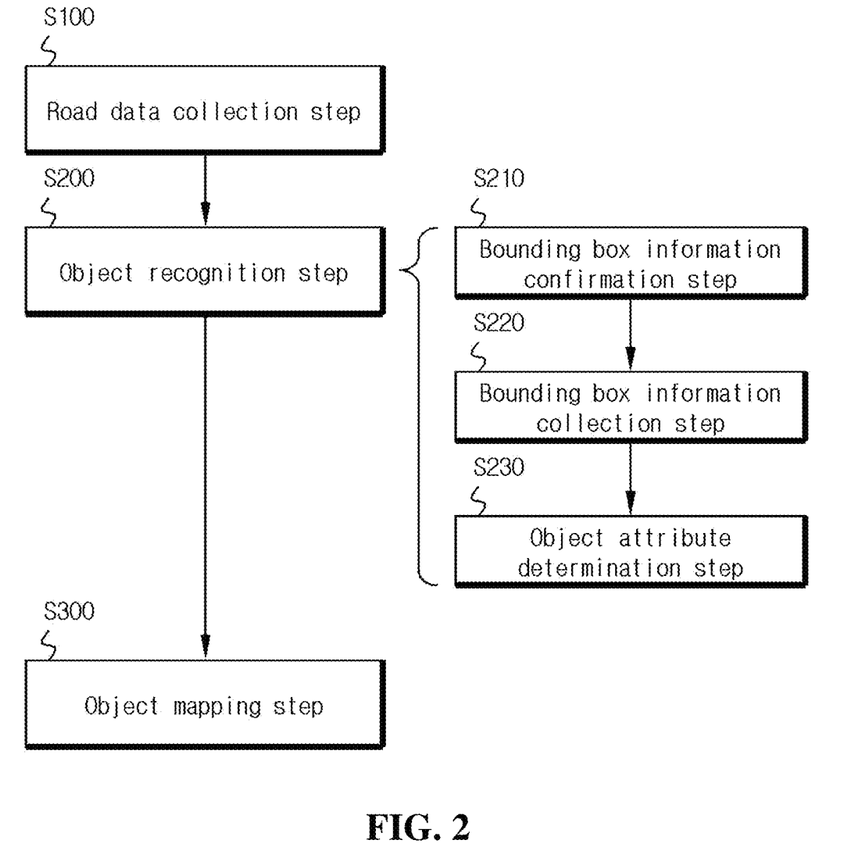
FIG. 2 is a flowchart illustrating a specific embodiment of step 'S200' shown in
FIG. 1.

FIG. 2 is a flowchart illustrating a specific embodiment of step 'S200' shown in FIG. 1, and FIGS. 3 to 6 are views for explaining FIG. 2.

Referring to FIG. 2, the object recognition step (S200) includes a bounding box information confirmation step (S210), a bounding box information collection step (S220), and an object attribute determination step (S230).

Figure 3:
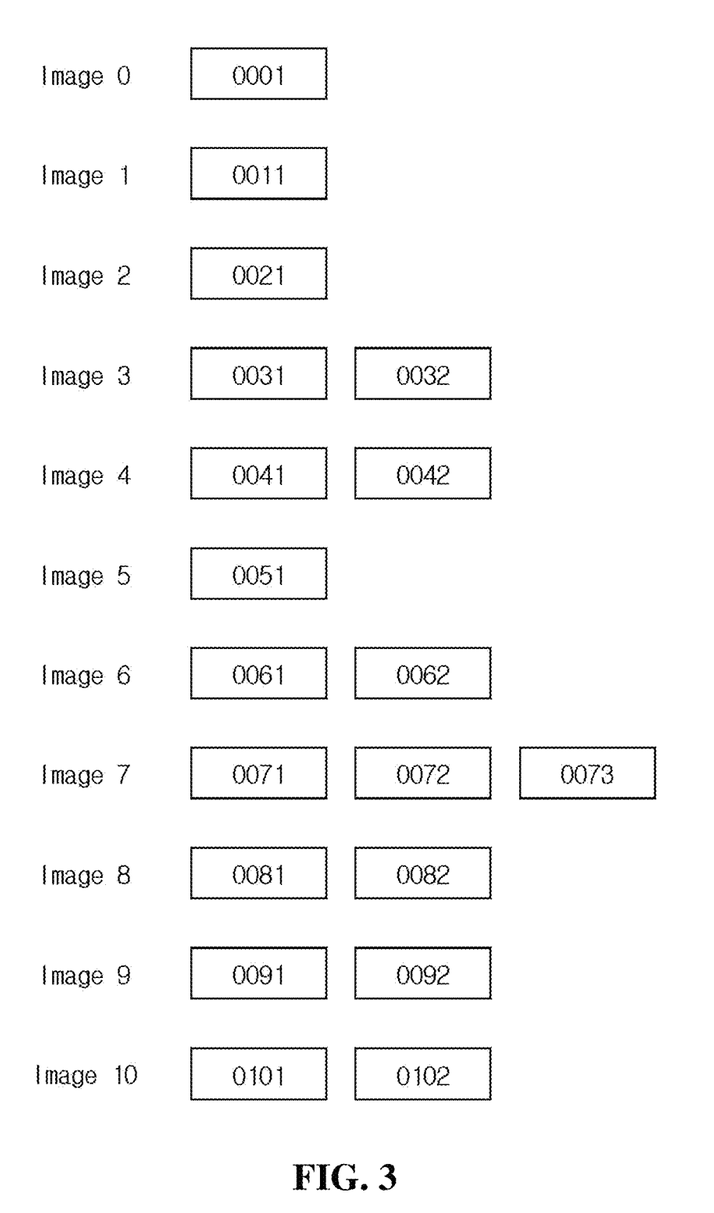
FIGS. 3 to 6 are views for explaining FIG. 2.

As shown in FIG. 3, for a plurality of successive image data (Image 0 to Image 10), the bounding box information confirmation step (S210) may detect a position (two-dimensional position in an image data) of an object (road surface marking, traffic sign or the like) included in the image data in the form of a bounding box.

At this point, information on the sequentially collected bounding boxes for each image data may be stored on a two-dimensional vector. In FIG. 3, the bounding boxes detected for each image data are displayed in the form of a box assigned with a number.

In addition, the bounding box information confirmation step (S210) may confirm bounding box information such as the number of bounding boxes included in a corresponding image data, object attribute information of the corresponding bounding box, and location coordinates of the corresponding bounding box.

The bounding box information collection step (S220) may track, for any one bounding box among the bounding boxes shown in FIG. 3, location coordinates for each image data, and collect information on the corresponding bounding box for each image data. Here, the location coordinates of each image data are two-dimensional coordinates on the image data.

Figure 4:
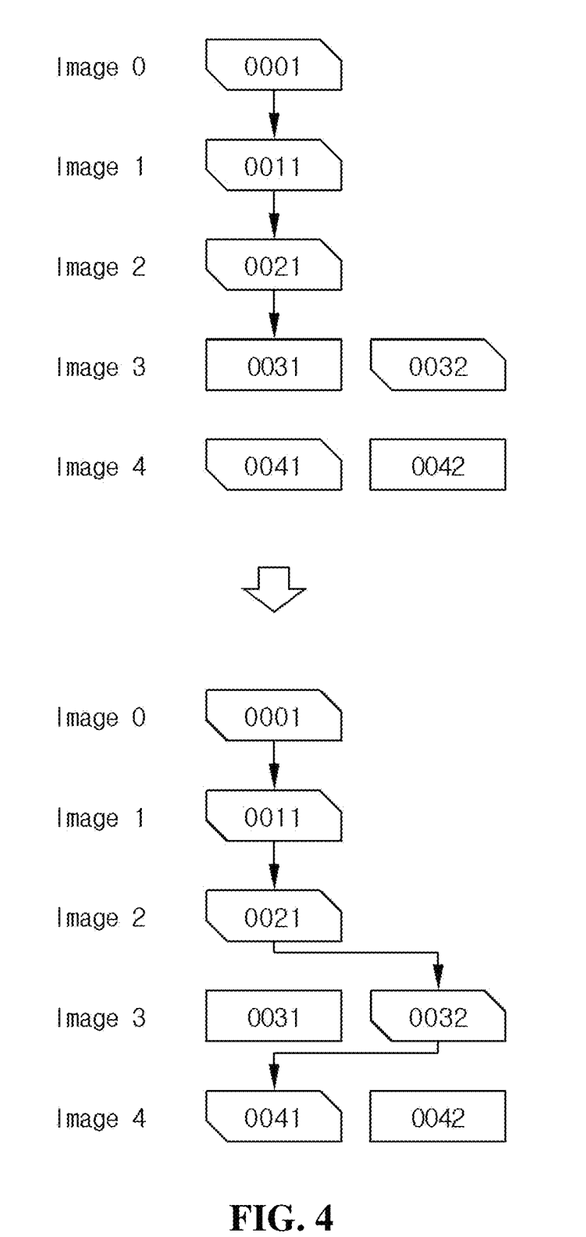

For example, as shown in FIG. 4, the process of confirming the location coordinates of a corresponding bounding box in the current image data (Image 0) and confirming a bounding box adjacent to the corresponding location coordinates in the next image data (Image 1) may be sequentially performed, and through the process like this, bounding boxes adjacent to a corresponding bounding box may be sequentially tracked for each image data (straight arrows in FIG. 4).

At this point, when there is one bounding box (bbox 0011) in the next image data (Image 1) within a tracking setting distance from a corresponding position (bbox 0001) in the current image data (Image 0) on the basis of the location coordinates of the corresponding bounding box, the corresponding bounding box (bbox 0011) may be selected.

When there are at least two bounding boxes (bbox 0031 and 0032) in the next image data (Image 3) within the tracking setting distance from a corresponding position (bbox 0021) in the current image data (Image 2) on the basis of the location coordinates of the corresponding bounding box, the closest bounding box may be selected (bbox 0032) as shown in FIG. 4.

At this point, the tracking setting distance includes the maximum distance of the difference between the positions of the same object included in two temporally adjacent image data, the difference being generated by the shaking of camera or the movement of the moving object, and the tracking setting distance may be set to various conditions and values according to the request of those skilled in the art.

Figure 5:
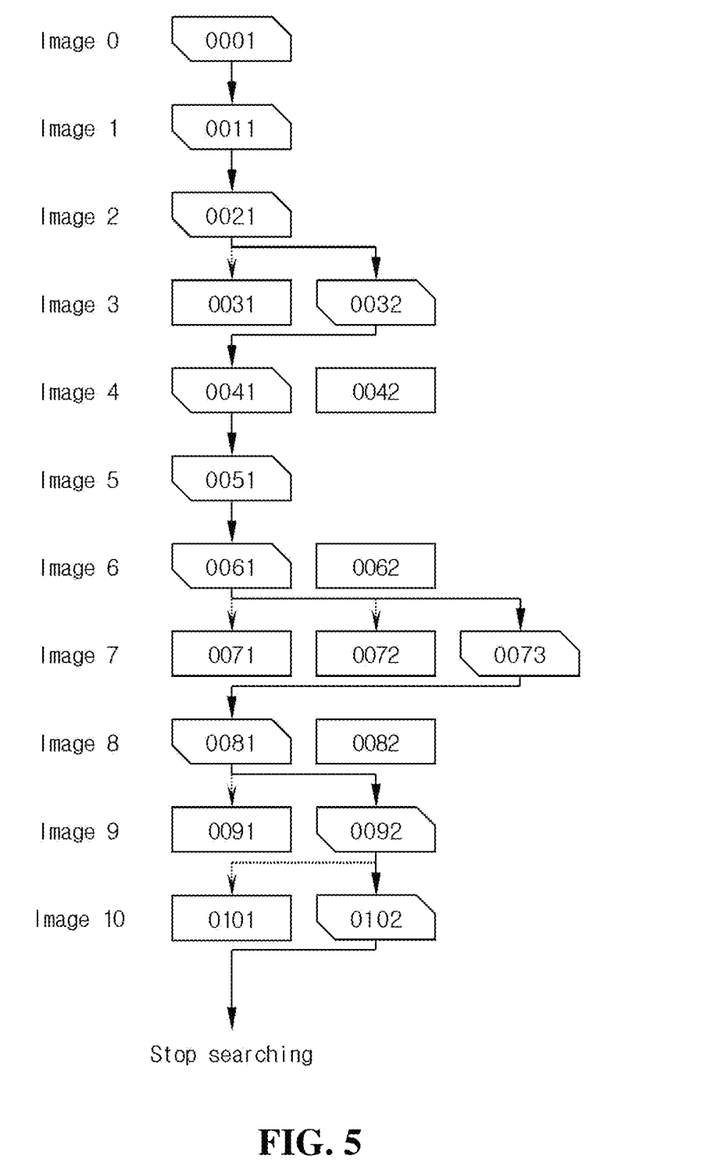

Through the process like this, as shown in FIG. 5, bounding boxes adjacent to a corresponding bounding box may be sequentially tracked for each image data (straight arrows in FIG. 5).

Then, when a bounding box does not exist in the next image data within the tracking setting distance from a corresponding position (bbox 0102) in the current image data (Image 10) on the basis of the location coordinates of the corresponding bounding box, tracking of the corresponding bounding box may be stopped (terminate the search).

On the other hand, the camera installed in the moving object may be shaken due to the movement or the like of the moving object. In this case, as the direction of capturing the image is changed momentarily, the position of the object may be excessively changed in some image data.

For example, there may be an occasion in which the object returns to the original position after the position of the object is excessively changed in a small number of image data among successive image data capturing a specific object.

Considering this situation, in the present invention, when a predetermined number (e.g., five) of image data, which do not have a bounding box within a tracking setting distance from a corresponding location (bbox 0102), are accumulated, tracking of the corresponding bounding box may be stopped.

Accordingly, when a specific object does not appear in three image data and then appears again in the fourth image data, tracking of the corresponding object may be continued.

Figure 6:
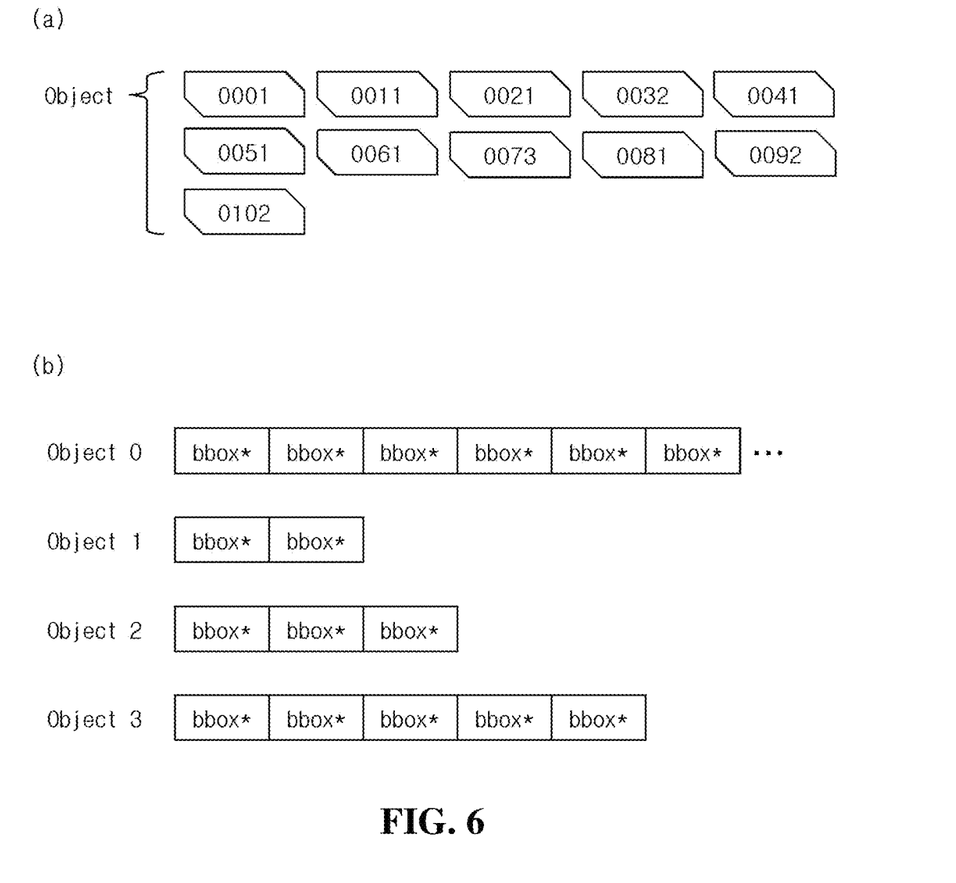

First, the object attribute determination step S230 may confirm bounding boxes tracked for each object as shown in FIG. 6(*a*).

Then, as shown in FIG. 6(*b*), the object attribute determination step S230 may select an object (Object 0) having the largest number of bounding boxes from the objects having the same attribute information among the tracked bounding boxes, as the object of the corresponding boundary box.

As described above, the reason for selecting an object having the largest number of bounding boxes is to prevent incorrect attribute information from being selected in a situation such as when the position of an object in an image is changed due to shaking of the camera or when an object is not recognized momentarily in a specific image due to sunlight or lighting.

Figure 8:
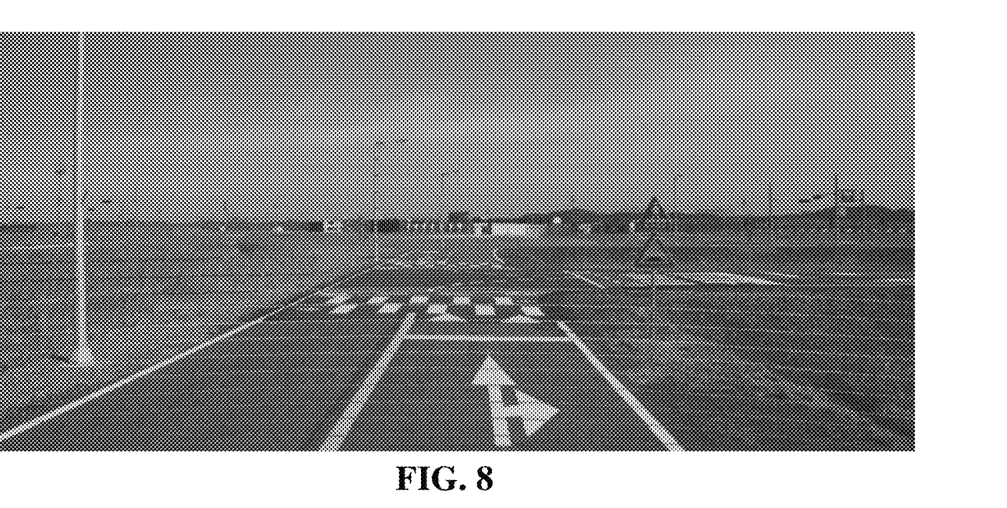
FIG. 8 is a view for explaining FIG. 7.

For example, an image captured by a camera configured in a moving object may show different traffic signs at the same position (two-dimensional position) in an image due to shaking or the like of the camera. Referring to FIG. 8, since the positions of the triangular traffic signs on the right side of the image are changed when the camera is shaken in the vertical direction, the triangular traffic sign appearing at the same position in two neighboring images may be changed to the triangular traffic sign in the upper or lower position.

Through this cleaning process, information on an object to be recognized and attributes of the object may be more correctly recognized.

For example, when a system which collects pictures (image data) and LiDAR data every 0.1 seconds and records the speed and direction (INS data) of a vehicle and GPS data every 0.005 seconds may obtain a recall of 85.26% and a precision (accuracy) of 72.97% in a section where 95 traffic signs exist in total, a result of improving the recall and the precision (accuracy) to 92.63% and 89.80% respectively can be obtained after the cleaning process described above.

Figure 7:
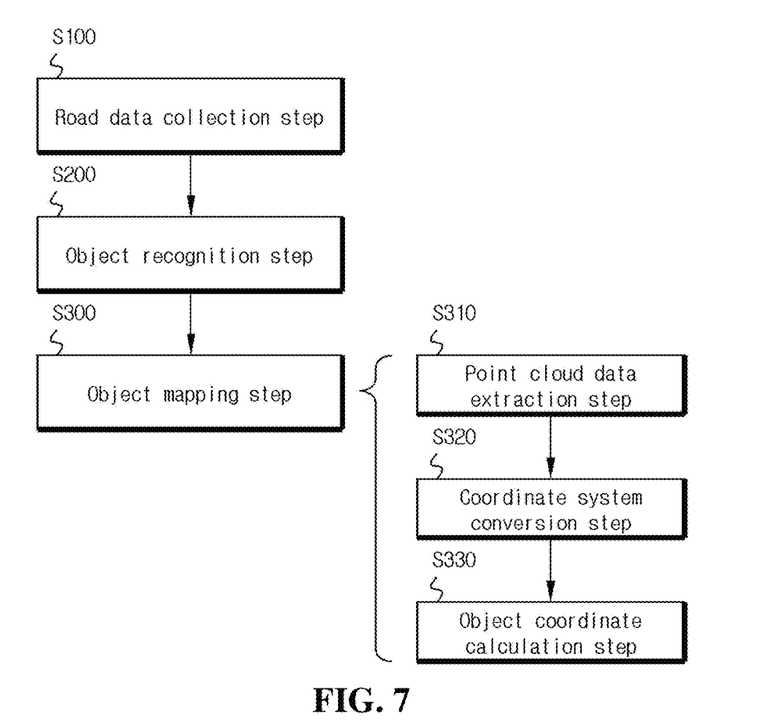
FIG. 7 is a flowchart illustrating a specific embodiment of step 'S300' shown in
FIG. 1.

FIG. 7 is a flowchart illustrating a specific embodiment of step 'S300' shown in FIG. 1, and FIG. 8 is a view for explaining FIG. 7.

Referring to FIG. 7, the object mapping step (S300) may include a point cloud data extraction step (S310), a coordinate system conversion step (S320), and an object coordinate calculation step (S330).

First, FIG. 8 shows a state of projecting three-dimensional point cloud data on an image using the positional relation between the camera and the LiDAR, and internal parameters of the camera.

At the point cloud data extraction step (S310), point cloud data in the inner area of the bounding box of each object are extracted among the point cloud data as shown in FIG. 8.

Then, at the coordinate system conversion step (S320), the three-dimensional coordinates of the point cloud data are converted into a map coordinate system of a high definition map.

As described above, when coordinate conversion is completed for all three-dimensional points in the inner area of the bounding box, the coordinates of the object included in the corresponding bounding box are calculated from the converted map coordinates at the object coordinate calculation step (S330).

For example, at the object coordinate calculation step (S330), a median value of the converted points of the point cloud data (point cloud data of the object except the background) included in a corresponding bounding box is calculated for each coordinate axis (one of X, Y and Z axes), and the coordinates of the object included in the corresponding bounding box may be calculated on the basis of the median value.

Presently, the need of HD-maps collected using a mobile mapping system (MMS) is spotlighted as an important issue for safe operation of autonomous vehicles and complement of techniques.

HD-map data may complement the physical limit of various sensors such as a camera, LiDAR and the like of an autonomous vehicle to which absolute coordinates of GPS are applied, and reduce the area to be calculated to minimum.

Therefore, on the basis of the HD-map, accuracy of the position information of an autonomous vehicle may be enhanced, and errors that may occur in the process of recognizing various information on the driving environment may be prevented through a fast real-time analysis.

On the other hand, since the markers actually placed on the road play important roles of providing guidance and information, such as guiding traffic routes to drivers and non-drivers, controlling driving behaviors, and maintaining traffic safety, information on the markers is also included in the HD-map.

Therefore, the HD-map enables correct and fast classification and extraction of numerous embedded road information (traffic lights, lanes, roads, curbs, signs, etc.), and may significantly reduce the possibility of problems directly connected to safety, such as a recognition error and the like, and generated by autonomous vehicles in the diverse and complicated environments.

It may be said that information on the surrounding environment in a road is quite essential and requires data of high accuracy, and rapidly update of correct information on the rapidly changing and newly constructed roads is essential.

Accordingly, the present invention has an advantage of collecting information on the markings on the road in real-time and mapping the information to a high definition map using a mobile mapping system including a remote sensing device and a navigation device.

In other words, the present invention has an advantage of registering efficient and correct information on a HD-map, compared with a conventional manual drawing method.

Particularly, the present invention has an advantage of collecting correct road marking information in real-time by extracting objects and attributes from successive images on the basis of deep learning, mapping the road marking information to a high definition map, and remarkably improving accuracy of recognizing the road marking information.

In other words, since an object type, such as a road surface marking or a traffic sign on the road, is recognized using deep learning, the present invention has an advantage of rapidly registering attributes of the object on a HD-Map without performing an individual manual work.

In addition, the present invention has an advantage of remarkably improving recall and precision (accuracy) in recognizing an object and attribute information through a process of cleaning a result of recognizing the object as one result.

Therefore, the present invention has an advantage of efficiently updating a HD-Map in real-time, which is most essential for autonomous driving.

Accordingly, reliability and competitiveness may be enhanced in the autonomous driving field, the road recognition field, the high definition road map field for autonomous driving, and the fields similar or related thereto.

A method of collecting road sign information using a mobile mapping system according to the present invention has been described above. It will be understood that the technical configuration of the present invention may be implemented in other specific forms by those skilled in the art without changing the technical spirit or essential features of the present invention.

Therefore, the embodiments described above should be understood as illustrative and not restrictive in all respects.

What is claimed is:

1. A method of collecting road sign information using a mobile mapping system, the method comprising:
a road data collection step of collecting road data including image data and point cloud data using the mobile mapping system;
an object recognition step of detecting a bounding box for each object included in successive image data, and confirming the object and attributes of the corresponding object; and
an object mapping step of calculating a spatial coordinate value of a corresponding object on a high definition map from the point cloud data, wherein
the object recognition step includes:
a bounding box information confirmation step of confirming bounding box information including the number of bounding boxes included in the image data, object attribute information of a corresponding bounding box, and location coordinates of the corresponding bounding box;
a bounding box information collection step of tracking, for any one bounding box, location coordinates for each image data, and collecting information on the corresponding bounding box for each image data; and
an object attribute determination step of selecting an object having the largest number of bounding boxes from objects having the same attribute information among the tracked bounding boxes, as an object of the corresponding boundary box, wherein
the step of confirming the location coordinates of a corresponding bounding box in a current image data, and confirming a bounding box adjacent to the corresponding location coordinates from a next image data is sequentially performed at the bounding box information collection step to sequentially track bounding boxes adjacent to the corresponding bounding box for each image data.

2. The method according to claim 1, wherein at the bounding box information confirmation step, information on the sequentially collected bounding boxes for each image data is stored on a two-dimensional vector.

3. The method according to claim 1, wherein at the bounding box information collection step, when there is one bounding box in the next image data within a tracking setting distance from a corresponding position in the current image data on the basis of the location coordinates of the corresponding bounding box, the corresponding bounding box is selected.

4. The method according to claim 1, wherein at the bounding box information collection step, when there are at least two bounding boxes in the next image data within a tracking setting distance from a corresponding position in the current image data on the basis of the location coordinates of the corresponding bounding box, a closest bounding box is selected.

5. The method according to claim 1, wherein at the bounding box information collection step, when a bounding box does not exist in the next image data within a tracking setting distance from a corresponding position in the current image data on the basis of the location coordinates of the corresponding bounding box, tracking of the corresponding bounding box is stopped.

6. The method according to claim 1, wherein at the bounding box information collection step, when a predetermined number of image data, which do not have a bounding box existing in the next image data within a tracking setting distance from a corresponding position in the current image data on the basis of the location coordinates of the corresponding bounding box, are accumulated, tracking of the corresponding bounding box is stopped.

7. The method according to claim 1, wherein the object mapping step includes:
- a point cloud data extraction step of extracting point cloud data in an inner area of a bounding box of each object from the point cloud data;
- a coordinate system conversion step of converting three-dimensional coordinates of the point cloud data into a map coordinate system of a high definition map; and
- an object coordinate calculation step of calculating coordinates of an object included in the corresponding bounding box from the converted map coordinates.

8. The method according to claim 7, wherein at the object coordinate calculation step, a median value of the converted points of the point cloud data included in the corresponding bounding box is calculated for each coordinate axis, and coordinates of the object included in the bounding box is calculated on the basis of the median value.

* * * * *